United States Patent [19]
Hooker

[11] 3,977,279
[45] Aug. 31, 1976

[54] LATHE FOR GENERATING SPHERICAL OR ASPHERICAL SURFACES ON WORKPIECES

[75] Inventor: Derrell C. Hooker, Lancaster, Ohio

[73] Assignees: Derrell C. Hooker; James Maxwell, Jr.; Donald S. Dill, all of Lancaster, Ohio ; part interest to each

[22] Filed: Apr. 16, 1975

[21] Appl. No.: 568,718

[52] U.S. Cl. .................................. 82/14 R; 82/12; 51/101 LG
[51] Int. Cl.[2] ........................ B23B 3/28; B23B 5/40
[58] Field of Search ............. 82/14 R, 12; 51/124 L, 51/101 LG, 217 L

[56] References Cited
UNITED STATES PATENTS

| | | | |
|---|---|---|---|
| 3,040,607 | 6/1962 | Bulliet | 82/14 R |
| 3,212,370 | 10/1965 | Spriggs et al. | 82/14 R |
| 3,881,378 | 5/1975 | Bettiol | 82/12 |

Primary Examiner—Leonidas Vlachos
Attorney, Agent, or Firm—Mahoney & Stebens

[57] ABSTRACT
A lathe for generating spherical surfaces of selected radiis on workpieces in the usual manner but which is provided with curve-selecting adjustable means for generating aspherical surfaces which deviate from the spherical surfaces in a predetermined relationship. The lathe is provided with the usual spindle which carries the workpiece for rotation about its fixed axis and a feed carriage which carries a suitable generating tool for swinging about a fixed pivot in generating contact with the face or surface of the workpiece. The feed carriage for supporting the generating tool includes means for supporting it for axial floating movement and means for constantly biasing it into contact with the surface of the workpiece. The curve-selecting adjustable means for causing deviations from spherical in the generated surface produced on the workpiece includes a cam of predetermined fixed curvature and a follower carried by the feed carriage along its centerline which passes through the fixed pivot, which is caused to constantly engage the cam by the feed carriage biasing means. It also includes means for supporting the cam independently of the feed carriage for adjustment selectively in either or both of two directions, relative to the fixed carriage pivot, in the direction of the axis of rotation of the workpiece or at a right angle thereto.

18 Claims, 12 Drawing Figures

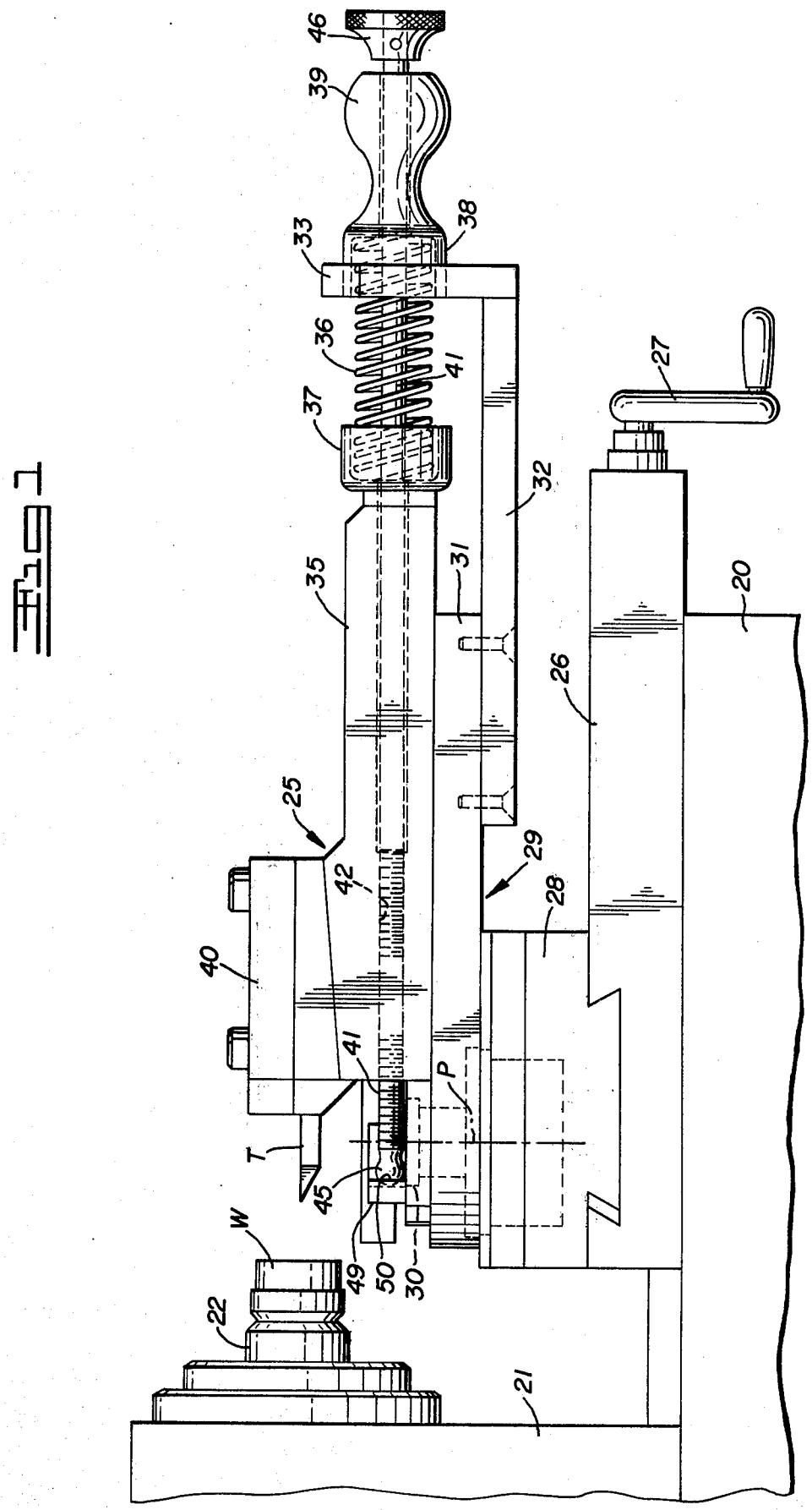

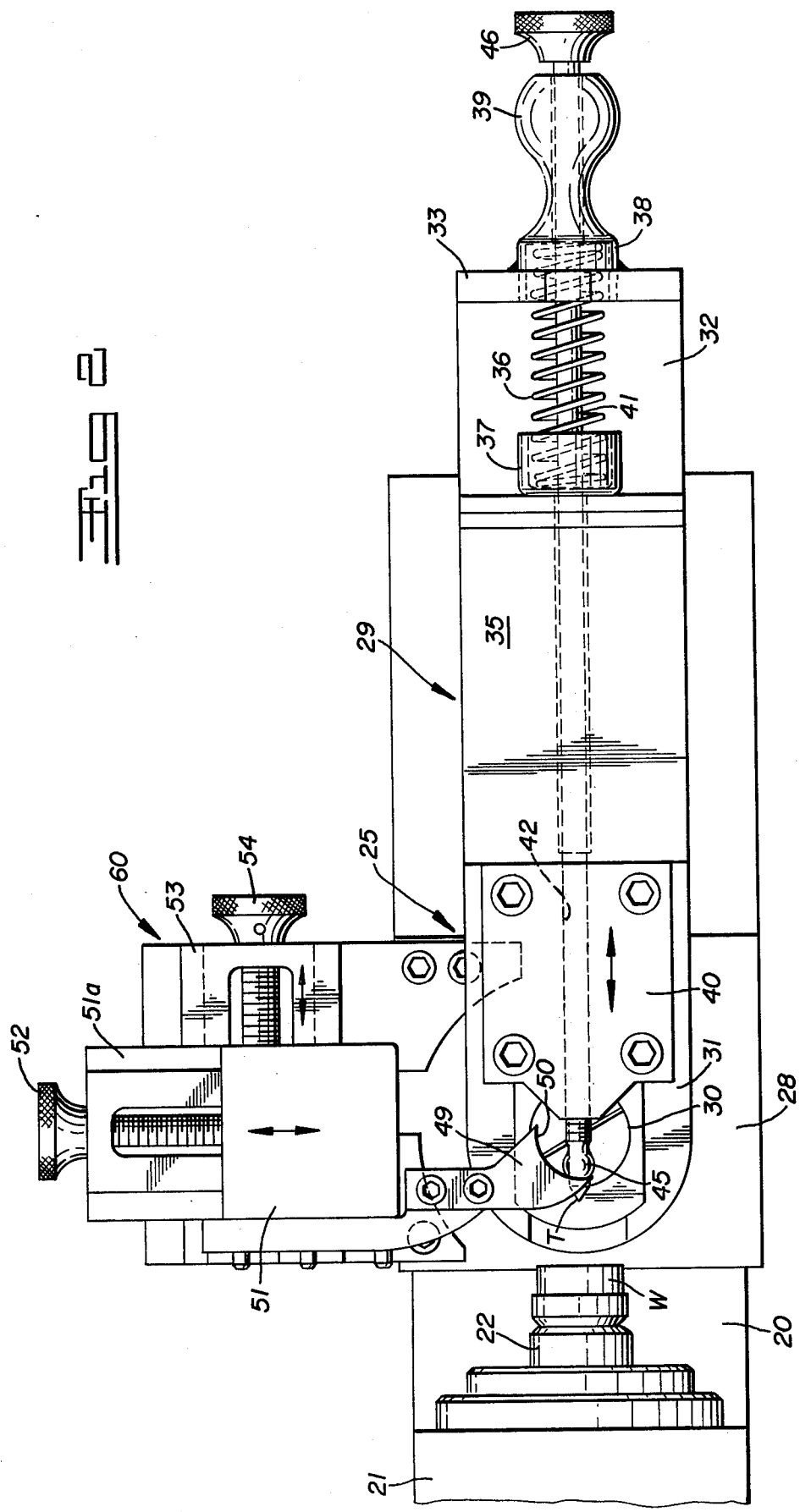

LATHE FOR GENERATING SPHERICAL OR ASPHERICAL SURFACES ON WORKPIECES

BACKGROUND OF THE INVENTION

This invention is particularly applicable to the generating of selected predetermined curvatures on the faces of lens blanks although it can be used in generating curvatures on surfaces of any workpieces to be used for producing various articles. The generating tool may be a cutting tool, a grinding tool or various other tools which will produce the desired surface curvature as it is swung across the workpiece in contact with the surface thereof while the workpiece is simultaneously rotated about its own axis.

At the present time, it is customary to use ordinary lathes for producing spherical surfaces on plastic contact lenses. The lens blank is rotated about its axis and the usual cutting tool is swung about a fixed pivot in contact with the lens blank to impart the desired spherical curvature to the surface of the lens blank. This is accomplished by swinging the feed carriage which carries the cutting tool about its fixed pivot in the usual manner. There is a need for a lathe for generating an aspherical surface curvature on the lens blank so that the resulting contact lens will more properly fit the eyeball which is not spherical.

The present invention provides a lathe which is so constructed that it can produce spherical or aspherical surfaces of selected curvatures on lens blanks or other workpieces.

SUMMARY OF THE INVENTION

The present invention provides a lathe which includes the usual spindle arrangement for supporting the workpiece for rotation about its own axis and for so rotating it. It includes a feed carriage which is adapted to carry the cutting tool and which is provided with the usual longitudinally adjustable base slide and the transversely adjustable upper slide carried thereby to provide for proper location of the cutting tool into cooperation with the workpiece carried by the spindle. The tool supporting sub-carriage itself is pivoted to the transversely adjustable upper slide by a pivot structure thereon and is rotated about the axis thereof by the usual means to gradually feed the tool across the face of the workpiece. The tool-supporting sub-carriage is of special construction, according to this invention, so that the lathe can be adapted to the cutting of aspherical surfaces on the workpiece. For this purpose, the tool sub-carriage itself is provided with a slide mounted for floating sliding movement so it can be advanced or retracted relative to the workpiece carried by the spindle. In addition, resilient means is provided on the tool sub-carriage in cooperation with the tool slide for always biasing it toward the spindle-supported workpiece. The path of the tool across the face of the workpiece, as the tool carriage is swung about said pivot, is determined by a simple cam arrangement which is provided according to this invention. This arrangement includes a cam which is of predetermined curvature, preferably a spherical curvature, and which is supported on the upper slide adjacent the tool carriage. The tool slide carries a cam follower at the centerline of the tool carriage which engages the cam and which is maintained in contact therewith by the biasing means acting on the slide. The cam is supported on the upper slide by a double-slide arrangement, one being adjustable parallel to the axis of the spindle and the other being adjustable at a right angle to the axis of the spindle. With this adjustment, the cam can be adjusted forwardly and rearwardly relative to the tool sub-carriage pivot or laterally relative thereto. If the cam is adjusted to a position concentric with the pivot, a spherical curve will be generated on the workpiece since there will be no advancing or retracting of the tool as its swings across the face of the workpiece. If the cam is adjusted to any other eccentric position relative to the pivot, an aspherical curvature will be generated on the workpiece, since as the cam follower is automatically swung with the tool carriage in contact with the curved cam, the tool slide is advanced or retracted due to the progressive variance in distance between the pivot axis and the contact point of the cam follower and cam surface.

BRIEF DESCRIPTION OF THE DRAWINGS

The best mode contemplated in carrying out this invention is illustrated in the accompanying drawings in which:

FIG. 1 is a side elevational view of a lathe embodying this invention.

FIG. 7 is a view like FIG. 6 but showing the aspherical curvature completed.

Figure 2:
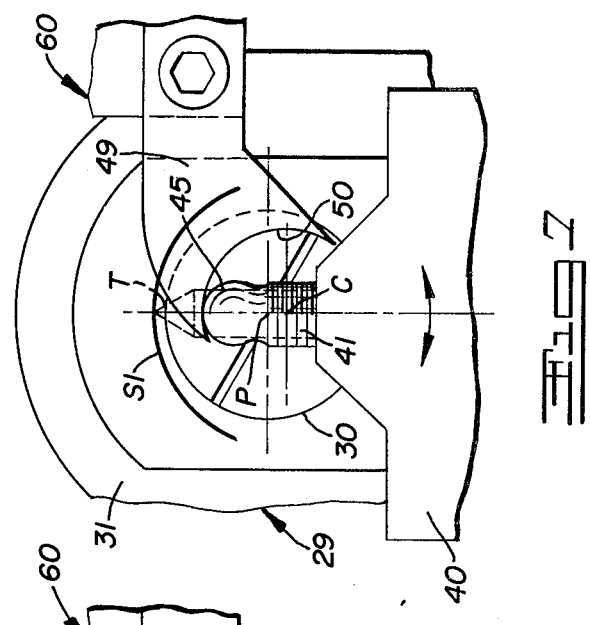
FIG. 2 is a plan view of the lathe.
Figure 6:
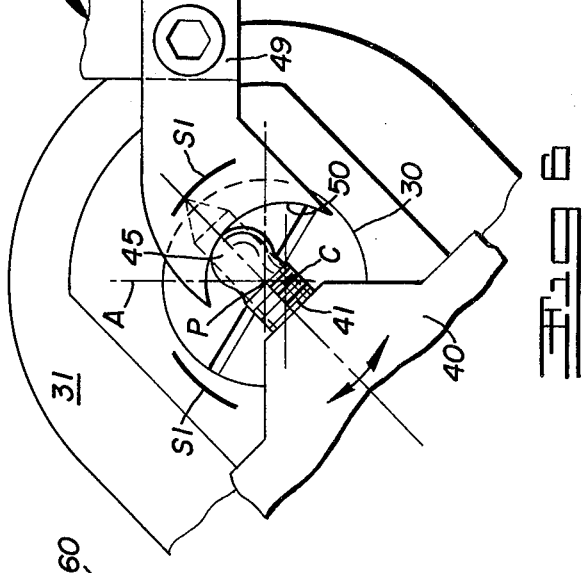
FIG. 6 is a view like FIG. 5 but showing the curvature further developed.
Figure 5:
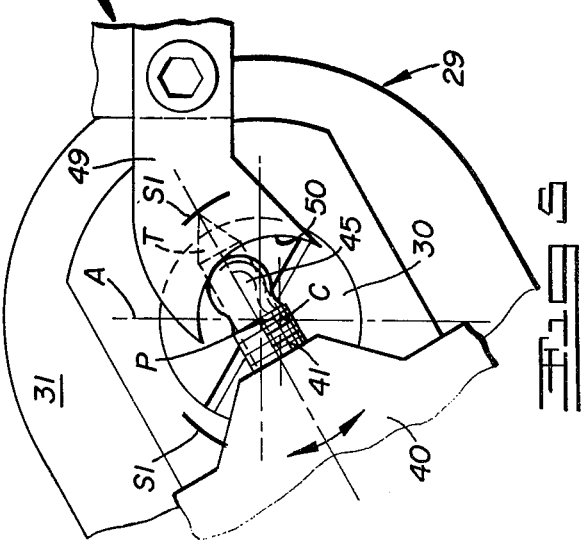
FIG. 5 is a view similar to FIG. 3 but showing the cam adjusted out of concentric relationship with the pivot in the direction of the spindle axis to generate a selected aspherical curvature which is indicated in its initial stages.

With specific reference to FIGS. 1 and 2, a lathe embodying the present invention is indicated as comprising a supporting frame 20 which has the usual upstanding housing 21 at one side and projecting inwardly from this housing is a spindle chuck 22 which is driven about its axis by suitable gearing within the housing. This spindle chuck carries a workpiece, which is indicated as being a lens blank W, but may be any other workpiece having a face upon which a desired curvature is to be generated.

Opposite the housing 21 on the frame 20 is the tool lathe and feed carriage unit which is indicated generally by the numeral 25. This unit is indicated as comprising the usual base slide 26 which is longitudinally adjustable on the frame 20, towards and from the spindle housing 21, by means of a crank 27. Carried on the base slide 26 is the usual transversely adjustable upper slide 28, which is adjusted in the usual manner by similar crank means (not shown). A tool-supporting sub-carriage 29 is located above the upper surface of the slide 28 and is pivoted thereto by the usual pivot structure 30. The sub-carriage 29 is rotated about the axis of pivot 30 by the usual means (not shown) to swing the sub-carriage 29 gradually about the axis of the pivot.

The tool sub-carriage 29 is of special construction according to this invention. It comprises a lower support plate 31 horizontally disposed above the slide 28 and pivoted thereto by the pivot 30. It extends outwardly from the slide 28 and has attached to its lower surface an L-shaped bracket 32, the main part of which is horizontal but which has the upright arm 33 at its outer or rear end. A tool carrying slide 35 is mounted on the plate 31 for forward and rearward sliding movement. It is biased forwardly by means of a compression spring 36 which is disposed between a rearwardly opening cup 37 fixed on the rear edge of slide 35 and a forwardly opening cup 38 fixed in an opening in the upright bracket arm 33 and having a rearward knob extension 39. The slide 35 has a tool chuck 40 at its upper side for clamping a cutting tool T in position to project toward the workpiece W carried by the spindle chuck 22. Extending slidably through the cup member 38 and the cup 37 is a screw 41 which also extends through a bore 42 in the slide 35. This bore is threaded and the forward portion of the screw is threaded for cooperation therewith. The screw extends forwardly out of the slide and its front end has a cam follower 45 formed thereon as a small sphere. A knurled nut 46 is keyed to the rear outer end of the screw and may be used in screwing the screw 41 forwardly or rearwardly to adjust the amount it projects from the slide 35. It will be apparent that since the screw is slidable axially relative to the bracket arm 33, the spring 36 will always tend to force or bias the slide 35 forwardly on the plate 31. Thus, the tool chuck 40 and the tool carried thereby will be free for forward and rearward floating movement but will be yieldingly biased forwardly by the spring 36.

To determine the forward or advanced position of the tool-carrying slide 35, a cam 50 is provided and is adjustably mounted above the forward end of the plate 31 in association with the pivot 30. This cam 50 is formed as a predetermined curvature on the outer end of a bracket 49. In the example shown, the curvature 50 is an arc of a circle although it could be of other contours. The bracket 49 is carried by a double slide or double carriage arrangement 60 on the transverse slide 28 for adjustment longitudinally of the spindle axis or at a right angle to the pivot axis to selectively position it relative to the axis of pivot 30. Thus, it will be noted that the cam bracket 49 has its inner end carried by a transversely movable upper slide 51 so that it projects over the plate 31. This slide 51 is mounted for transverse sliding movement on a lower slide 51a, the slide being adjusted laterally by means of a screw 52. The slide 51a is carried by a slide 53 which is mounted on the plate 28 for longitudinal movement, this adjustment being accomplished by means of a screw 54. The screws 52 and 54 may thus be used to adjust the cam 50 laterally or rearwardly and forwardly relative to the pivot 30. If the cam 50 is of a circular curvature, it can be adjusted concentric with the pivot 30. The cam-follower 45 will be biased into contact with the cam 50 by means of the spring 36 acting on the floating tool-carrying slide 35.

The various parts of the lathe have been described and include the floating tool-carrying slide 35 and the cam follower 45 projecting from the front end thereof which is yieldingly biased into engagement with the cam 50 by the spring 36. As the tool carriage is swung about the pivot 30, the tool T will have its contact position with the workpiece W controlled by the position of the cam 50 relative to the pivot 30. As pointed out above, this position is determined by adjustment of the double slide arrangement in either or both of two directions. In FIGS. 3 to 12 there are illustrated various curvatures which can be generated by adjusting the position of the cam 50 relative to the pivot 30. In these Figures, for clarity the workpiece W itself is not shown and the tool chuck is not shown but the relative positions of the cam follower 45 and tool T are shown and the curvatures which would be generated on the workpiece W are illustrated.

It will be understood that in using the lathe, the base slide 26 will be adjusted longitudinally and the cross slide 28 will be adjusted laterally to position the tool T in contact with the face of the workpiece W initially at the outer edge of the workpiece. The double slide arrangement 60 will be adjusted to position the cam 50 as desired and the knob 46 will be turned to cause the screw 41 to feed forwardly until it projects form the slide 35 a preselected distance. With the spindle rotating, the tool T is gradually swung inwardly toward the center of the workpiece by swinging the tool sub-carriage 29 about the pivot 30.

Figure 4:
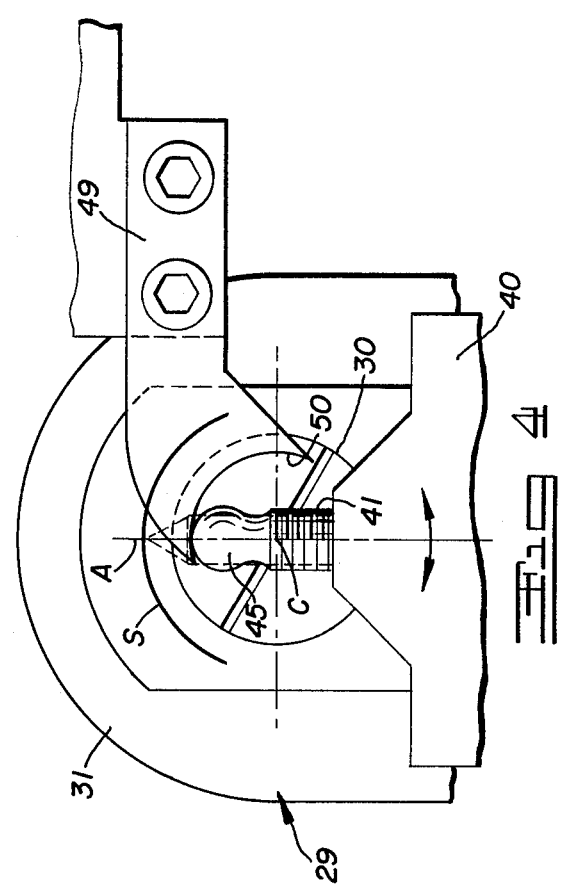
FIG. 4 is a similar view indicating the completion of the spherical curve.
Figure 3:
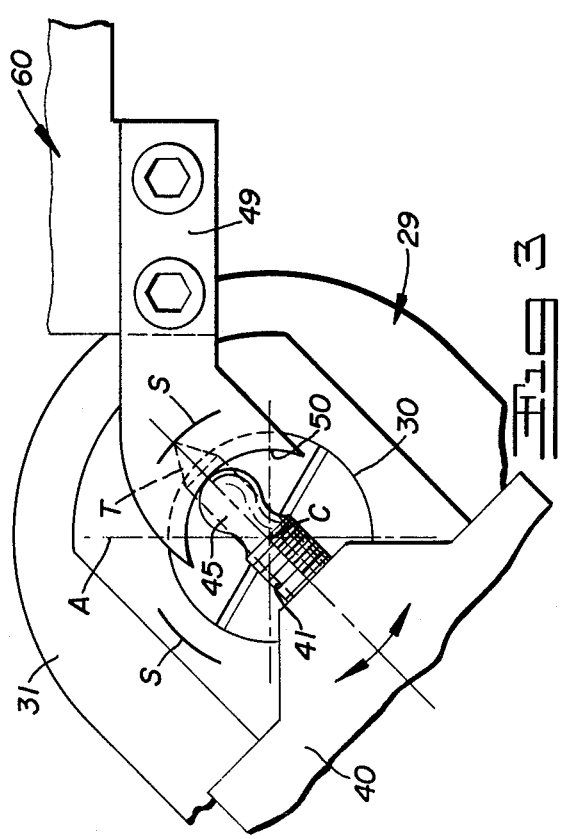
FIG. 3 is a schematic plan view indicating the start of the generation of a concave spherical surface when the cam is selectively set in a position concentric with the relatively fixed carriage pivot.
Figure 12:
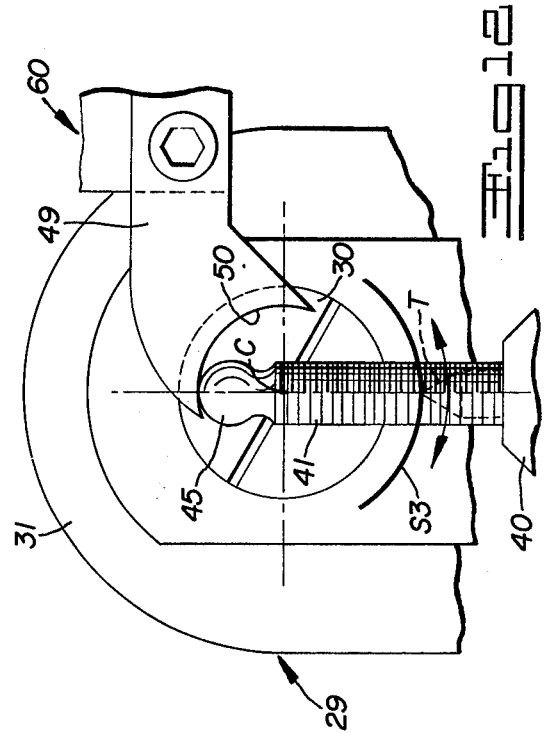
FIG. 12 is a view similar to FIG. 3 showing the lathe adjusted to generate a convex curvature.
Figure 11:
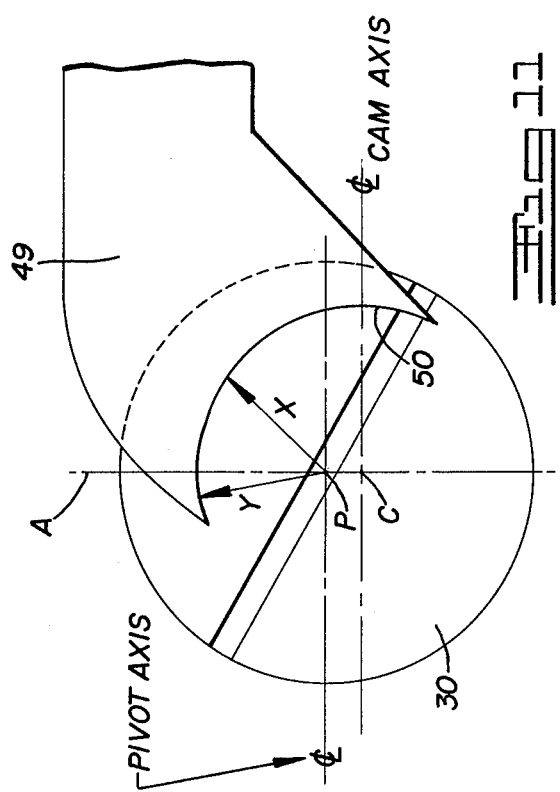
FIG. 11 is a schematic view illustrating how the curvature generated progressively changes from spherical, in the position of adjustment of the cam in FIG. 5.

If the cam curvature is an arc of a circle, as indicated, and if the cam is adjusted to a position as indicated in FIG. 3, where it is concentric with the axis of the pivot 30, the resulting curvature generated on the workpiece W will be spherical. It will be noted that the cam 50 is of such an extent that in this position, it extends inwardly beyond the axis A. This curvature is indicated at S by heavy lines in this Figure but it will be understood that in practice this will be the actual surface curvature generated on the workpiece W. The axis of pivot 30 and the axis of curvature of the cam 50 coincide in FIG. 3 but in the other Figures the axis of pivot 30 is indicated at P. The base curve to be produced on the workpiece will be selected by using the screw 41 to position the tool T relative to the pivot axis P, this being accomplished by extending or retracting the cam follower 45 relative to the forward end of the tool-carrying slide 35. The base radius of curvature of the surface S will be the distance from the tip of the tool T to the axis P of the pivot. If the tool tip is advanced relative to axis P, as indicated in FIGS. 3 to 10, the surface S generated on the workpiece W will be concave. If the tool tip T is retracted to be behind the pivot axis as indicated in FIG. 12, the surface S generated will be convex.

Referring again to FIG. 3, it will be apparent that as the tool carrying sub-carriage 29 is swung about the pivot axis P of the pivot 30, the tip of the tool T will swing through a circular arc, since the cam follower 45 contacts with the cam surface 50, and the axis C of the cam surface coincides with the pivot axis P which lies along the spindle axis A. Thus, although the cam follower 45 is yieldingly biased against the cam surface 50, there will be no advancing or retraction of the tool-carrying slide 40 since the distance between the point of contact of the cam follower 45 with the cam and the pivot axis P will not vary during the swinging of the sub-carriage 29 about the pivot axis P. Thus, the base radius of swing of the tool T about the axis P will not vary during traverse of the tool across the face of the workpiece W and, consequently, the surface S produced will be spherical. As indicated in FIG. 3, the surface is generated from the outer edge of the workpiece W inwardly as indicated by the arcs S which will be arcs of a circle. The generation will continue as the tool T sweeps inwardly, towards the center of the workpiece W to generate the complete spherical surface as indicated by the arc of the circle S in FIG. 4.

Assuming it is desired to produce an aspherical surface, the tool slide 35 is positioned by turning the nut 46 to locate the tip of the tool T at the proper distance from the pivot 30 to select the desired base curve. Then the double slide 60 is adjusted to obtain the desired departure from the spherical curvature and generate a resulting predetermined aspherical curvature. For example, assuming an elliptical curve is desired, the double slide 60 is adjusted as indicated in FIGS. 5 to 7 and 11, to produce the final elliptical curvature S1 indicated in FIG. 7. This is accomplished by adjusting the slide 53 by screw 54 rearwardly to displace the center or axis of curvature C of the cam 50 rearwardly relative to the pivot axis P and along the spindle axis A as indicated in this Figure and FIG. 11.

With this adjustment, it will be apparent that as the sub-carriage swings about the pivot 30 to cause the tool to traverse the face of the rotating workpiece inwardly from its outer edge to its center, the tool T will be caused to traverse an elliptical path. This is due to the fact that since cam axis C is displaced rearwardly relative to pivot axis P, the distance between the point of contact of the follower 45 and the cam surface, does not remain constant, as in the concentric setting of FIG. 3, but gradually varies. In this instance, the point of contact will retract as the tool swings inwardly since, as indicated diagrammatically in FIG. 11, this distance decreases which will be apparent from a comparison of the distances X and Y in FIG. 11. The result is that the radius of curvature of the surface S is progressively decreased as the tool travels inwardly toward the center of the workpiece. Thus, as will be apparent from a comparison of FIGS. 5 to 7, the surface S1 will be gradually generated and the final surface S1 will have an aspherical concave curvature.

Figure 10:
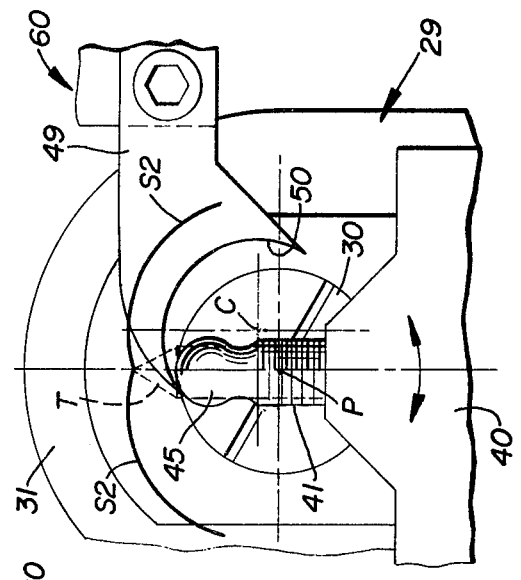
FIG. 10 is still another view like FIG. 8 showing the curvature completed.
Figure 9:
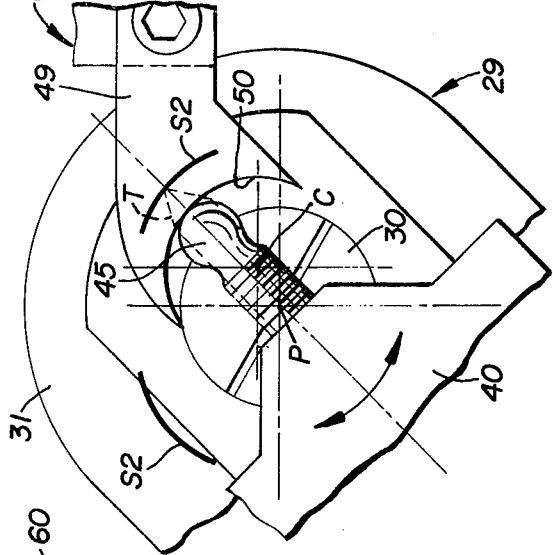
FIG. 9 is a like view showing the curvature further developed.
Figure 8:
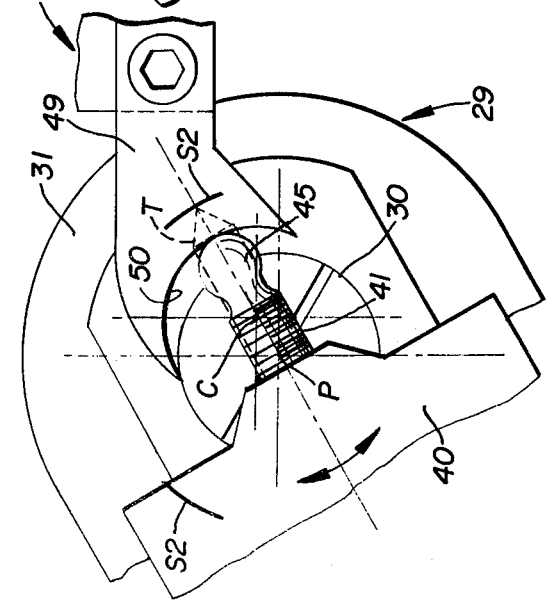
FIG. 8 is a view similar to FIG. 5 but showing the cam adjusted in a reverse direction relative to the spindle axis parallel thereto and in a second direction laterally of and at a right angle to the spindle axis, to generate a double aspherical curvature thereon which is shown in its initial stages of development.

FIGS. 8 to 10 show the adjustment of the cam 50 not only in the direction of the spindle axis A but also laterally at a right angle thereto. It will be noted that the cam 50 is adjusted so that its center C is moved forwardly towards the workpiece W as well as laterally of the workpiece or spindle axis A, whereas in FIG. 5, the center C was moved rearwardly along the axis A. This double adjustment is accomplished by forward adjustment of slide 53 by means of knob 54 and lateral outward adjustment of slide 51 by means of knob 52. The result will be the generation of a double concave curve S2, the successive steps of development being indicated in FIGS. 8, 9 and 10. In this example as the tool T swings inwardly across the face of the workpiece, the radius of curvature of the surface S2, as it is developed, is gradually and progressively decreased. This is due to the fact that as the follower 45 is moved across the cam 50, the point of contact gradually moves closer to the pivot P. This causes a retraction of the tool T relative to the surface of the workpiece W due to the shortening of the distance between the tool T and the pivot P. The concave curved surface S2 so produced will be a combination of two identical concave surfaces which merge at the center of the workpiece.

If it is desired to produce a curved convex surface on the workpiece W, the lathe will be so adjusted that the pivot axis P will be ahead of the tool as indicated in FIG. 12. This will be accomplished by adjustment of slide 20 to move the pivot axis beyond the face of the workpiece toward the housing 21 and turning the knob 46 to cause the screw 41 to feed forwardly out of the slide 40 so that the tool tip T will be located sufficiently behind the pivot axis P to determine the base curve. If the cam 50 is now adjusted by the double slide 60 so that its center C coincides with the pivot axis A, the resulting curvature S3 generated on the workpiece will be spherical, since there will be no axial movement of the slide 40 as it swings about the pivot P, due to the fact that the point of contact of the follower 45 and cam 50 remains the same distance from the pivot axis P at all times during the swing of the tool T across the face of the workpiece. It will be understood that with the tool T behind the pivot P, as in FIG. 12, any adjustment of the double slide arrangement 60 to move the cam axis C out of coincidence with the pivot axis P, will result in the generation of an aspherical convex surface on the face of the workpiece W.

It will be apparent from the above that this invention provides a lathe which can be used for generating spherical or aspherical surfaces. This is accomplished by using a tool carriage which is mounted for floating movement towards and from the face of the workpiece as the tool is swung about the workpiece and the double carriage arrangement which carries the cam for adjustment in the direction of the workpiece or spindle axis or at a right angle thereto. The cam, if spherical surfaces are to be produced, is an arc of a circle and is adjusted concentric with the tool carriage pivot. If aspherical surfaces are to be produced, the cam is adjusted in one or both directions away from the pivot to produce the desired deviations from spherical in the surface generated. If only aspherical surfaces are to be generated on the surface of the workpiece, the cam need not be an arc of a circle but could even be flat. Only one cam is needed, as compared to prior art arrangements which require a special cam for each curvature generated. The reason only one cam is required is because the position of the cam is changed laterally or longitudinally relative to the spindle axis and each time an adjustment is made, a different curvature is generated.

The means which causes deviations from the spherical curvature thus comprises mainly the floating tool support which permits advancing or retraction of the tool relative to the workpiece, the means for biasing the tool yieldingly toward the workpiece, and the cam means for controlling advancing or retracting of the tool support which is adjustable axially of the workpiece axis or laterally of the workpiece axis or both. However, it is to be understood that a reverse arrangement of the tool and spindle supports could be provided, that is, the tool could be fixed axially and the workpiece would be mounted for the floating movement relative to the tool.

The curvature of the cam which is selected will depend upon the amount of change of curve that is needed for the particular machine to produce, this, in turn, depending upon the nature of the workpiece. The extent of the cam will be such that the section of the cam will be long enough to prevent the follower from running off the end of the cam in a 90° swing of the tool across the face of the workpiece, the cam usually extending inwardly beyond the pivot axis. The cam's lateral position is determined by first positioning it around the pivot point so that there is no movement of the tool slide as it is rotated through 90°. This is the positioning to give a spherical cut. The center of radius of the cam is concentric with the pivot axis of the tool slide. If the cam is moved along the center line of the spindle towards the pivot point, the cut will have a greater radius at the edge than at the center. By moving the cam in two directions off of the center line, it is possible to create double aspheric surfaces.

In the above description, a lathe has been given as the best means contemplated in carrying out this invention. However, it is to be understood that the cam and double-slide or carriage adjusting unit can be applied to other surface generating machines where it is desired to control the relative movements of a workpiece and forming tool, such as a grinder or a milling machine. Also, the tool will not be of the cutting type disclosed, but may be a grinding or abrading type or other surface-forming types. The size of the workpiece is not critical and may be small or large.

I claim:

1. A machine for generating a surface on a workpiece comprising a spindle support unit for supporting the workpiece member for rotation about its axis, a tool-support unit for supporting a tool member in cooperation with the face of the workpiece, one of said units including a support for supporting one of the members for swinging movement about a pivot located along the spindle axis, so that the tool member will swing across the face of the workpiece member to generate a surface thereon, said support for the one member including floating means carried thereon for floating movement relative to said pivot so that the member carried thereby is advanced or retracted relative to the pivot and the other member, yieldable biasing means acting on said floating means to cause the member carried thereby to movably advance relative to said pivot into contact with the other member, and a cam arrangement for controlling the floating movement of said floating means relative to said pivot in cooperation with said biasing means, said cam arrangement including a cam member and a cam follower member, one of said last named members being supported in normally fixed position relative to the floating means and the other being carried by the floating means, said normally-fixed member being carried by a member adjustable relative to the pivot axis in a direction longitudinally relative to said spindle axis.

2. A machine for generating a surface on a workpiece comprising a spindle support unit for supporting the workpiece member for rotation about its axis, a tool-support unit for supporting a tool member in cooperation with the face of the workpiece, one of said units including a support for supporting one of the members for swinging movement about a pivot located along the spindle axis, so that the tool member will swing across the face of the workpiece member to generate a surface thereon, said support for the one member including floating means carried thereon for floating movement relative to said pivot so that the member carried thereby is advanced or retracted relative to the pivot and the other member, yieldable biasing means acting on said floating means to cause the member carried thereby to movably advance relative to said pivot into contact with the other member, and a cam arrangement for controlling the floating movement of said floating means relative to said pivot in cooperation with said biasing means, said cam arrangement including a cam member and a cam follower member, one of said last named members being supported in normally fixed position relative to the floating means and the other being carried by the floating means, said normally fixed member being carried by a double carriage adjustable relative to the pivot axis both in a direction longitudinally relative to said spindle axis and in a direction laterally at a right angle to the spindle axis.

3. A machine for generating a surface on a workpiece comprising a spindle support unit for supporting the workpiece member for rotation about its axis, a tool-support unit for supporting a tool member in cooperation with the face of the workpiece, one of said units including a support for supporting one of the members for swinging movement about a pivot located along the spindle axis, so that the tool member will swing across the face of the workpiece member to generate a surface thereon, said support for the one member including floating means carried thereon for floating movement relative to said pivot so that the member carried thereby is advanced or retracted relative to the pivot and the other member, yieldable biasing means acting on said floating means to cause the member carried thereby to movably advance relative to said pivot into contact with the other member, and a cam arrangement for controlling the floating movement of said floating means relative to said pivot in cooperation with said biasing means, said cam arrangement including a cam member and a cam follower member, one of said last named members being supported in normally fixed position relative to the floating means and the other being carried by the floating means, said cam member being the one supported in normally-fixed position and the cam follower member being the one carried by the floating means and being carried at a centerline of the pivoted support passing through the pivot axis, said cam member being carried by a double cam carriage adjustable relative to the pivot axis both in a direction longitudinally relative to said spindle axis and in a direction laterally at a right angle to the spindle axis.

4. A machine according to claim 3 in which the cam follower is carried by said floating means for projection outwardly thereof into engagement with said cam, said biasing means acting thereon to cause it to yieldingly engage said cam.

5. A machine according to claim 4 in which the cam has a surface generated as an arc of a circle, and the cam follower is a spherical member contacting said cam surface, said cam being adjustable by the double carriage which carries it into and out of concentric relationship with said pivot axis.

6. A machine according to claim 5 in which the cam follower is formed on the outer projecting end of a screw mounted in said floating means for axial adjustment to vary the amount it projects therefrom.

7. A machine according to claim 6 in which the floating means is a tool-supporting slide mounted on said pivoted support along the centerline thereof for cooperation with the workpiece which is carried on said spindle and the screw is mounted in said tool slide for axial adjustment.

8. A machine according to claim 7 in which the biasing means is a compression spring mounted between said tool slide and a fixed part of said pvioted support.

9. A machine according to claim 8 in which the tool support unit includes a base feed slide movable longitudinally towards and from the spindle support unit, and a transversely adjustable upper slide carried by said base slide, said upper slide having the pivoted support pivoted thereto at said pivot axis, said double adjustable cam carriage being disposed on said upper slide at one side of the pivot axis and including a lower cam slide adjustable on said upper transversely adjustable slide for longitudinal movement parallel to the spindle axis, and an arm carried by said upper transversely adjustable slide which projects inwardly therefrom and has said cam at its inner end.

10. A machine for generating a surface on a workpiece comprising a spindle unit having means for supporting a projecting spindle and rotating it about its axis and chuck for mounting a workpiece on the projecting spindle; and a tool-supporting unit having a chuck for mounting a tool to project it toward the mounted workpiece and cause it to sweep across the face thereof; said tool-supporting unit comprising a base slide for movement axially of the tool spindle, an upper slide mounted on the base slide for movement transversely of the spindle axis, a tool-carrying slide support pivoted to the upper slide for movement about a pivot axis which will be in the same plane as said spindle axis and at a right angle thereto, a slide mounted on said pivoted support having the chuck for supporting the tool along a centerline passing through said pivot axis and projecting toward said workpiece, said slide being mounted for floating movement longitudinally of the centerline relative to the pivot axis, biasing means between the slide and the support for yieldingly biasing the slide towards the spindle-supported workpiece, a cam arrangement for cooperating with the biasing means to control the floating position of said tool-carrying slide on said pivoted support, said arrangement comprising a projecting cam follower carried by the tool-supporting slide at its centerline and a cam engaged by said cam follower and carried by a double cam slide arrangement on said upper slide, said double cam slide arrangement comprising an upper slide carrying the cam adjacent said pivot, said upper cam slide being mounted on a lower cam slide for adjustment relative to the pivot in a direction transverse to the spindle axis, and said lower cam slide being mounted on said first-named upper slide for movement in the direction of extent of the spindle axis and parallel thereto.

11. A machine according to claim 10 in which the cam is carried by an arm which projects over the pivoted tool-carrying slide support adjacent the pivot thereof, said cam having a surface formed as an arc of a circle and being adjustable to and from a concentric position relative to said pivot by adjustment of said cam slides.

12. A machine according to claim 10 in which the cam follower is carried by the forward end of a screw, means is provided for adjustably mounting the screw in the slide to project it from the leading end of the slide in the direction of projection of the tool and at the centerline of the slide, said housing means comprising a compression spring between the rear end of the slide and an abutment carried by said pivoted slide support.

13. A machine according to claim 11 in which the cam extends inwardly beyond the pivot axis when in its concentric position.

14. A machine according to claim 2 in which the cam follower is carried by said floating means for projection outwardly thereof into engagement with said cam, said biasing means acting thereon to cause it to yieldingly engage said cam.

15. A machine according to claim 14 in which the cam has a surface generated as an arc of a circle, and the cam follower contacts said cam surface, said cam being adjustable by the double carriage which carries it into and out of concentric relationship with said pivot axis.

16. A machine according to claim 15 in which the cam follower is formed on the outer projecting end of a screw mounted in said floating means for axial adjustment to vary the amount it projects therefrom.

17. A machine according to claim 16 in which the floating means is a tool-supporting slide mounted on said pivoted support along the centerline thereof for cooperation with the workpiece which is carried on said spindle and the screw is mounted in said tool slide for axial adjustment.

18. A machine according to claim 17 in which the biasing means is a compression spring mounted between said tool slide and a fixed part of said pivoted support.

* * * * *